F. PERKINS.
FISH TRAP.
APPLICATION FILED FEB. 17, 1920.
1,357,114.
Patented Oct. 26, 1920.
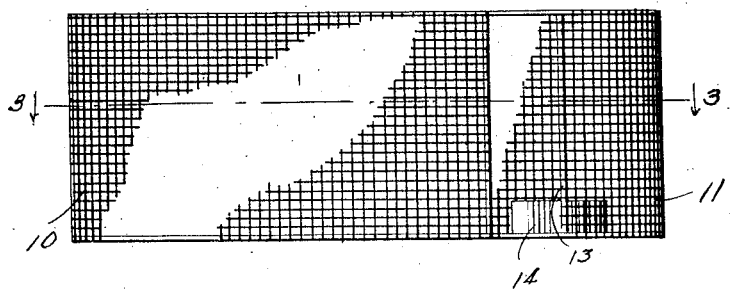
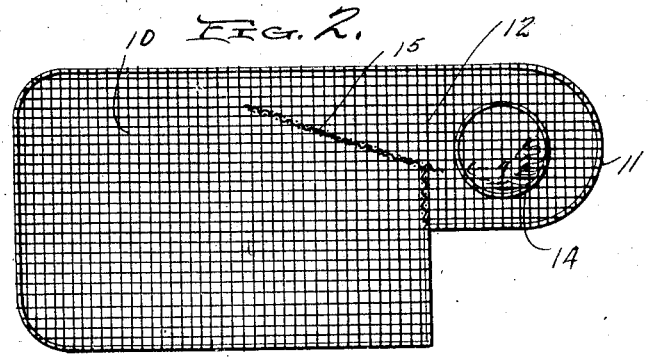
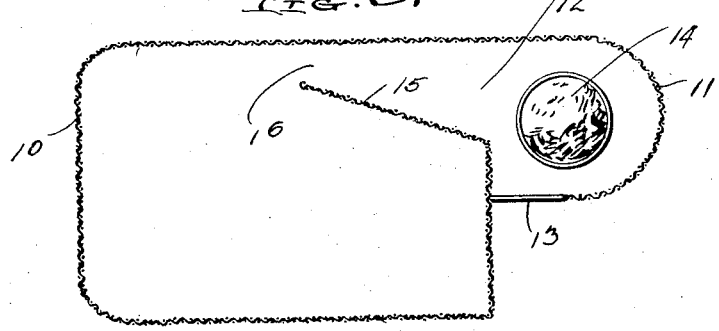
Inventor
Frank Perkins
By
Attorneys

UNITED STATES PATENT OFFICE.

FRANK PERKINS, OF BAUXIPPE, ARKANSAS.

FISH-TRAP.

1,357,114.  Specification of Letters Patent.  Patented Oct. 26, 1920.

Application filed February 17, 1920. Serial No. 359,243.

*To all whom it may concern:*

Be it known that I, FRANK PERKINS, a citizen of the United States, residing at Bauxippe, in the county of Crittenden, State of Arkansas, have invented certain new and useful Improvements in Fish-Traps; and I do hereby declare the following to be a full, clear, and exact description of the invention, such as will enable others skilled in the art to which it appertains to make and use the same.

This invention relates to new and useful improvements in traps and particularly to traps for catching fish.

One object of the present invention is to provide a novel and improved device of this character wherein the bait is so located that when the fish takes its bite and starts off to a place where it can eat the piece of bait, the fish will be lured or guided into the trap.

Another object is to so form the entrance portion of the trap, and so locate the bait with respect thereto, that when the fish has taken its bite of the bait it is prevented from getting out of the entrance in any way except to go into the trap.

Other objects and advantages will be apparent from the following description when taken in connection with the accompanying drawing.

In the drawing:

Figure 1 is a side elevation of a trap for fish made in accordance with my invention.

Fig. 2 is a top plan view of the same.

Fig. 3 is a horizontal longitudinal central sectional view through the trap, taken on the line 3—3 of Fig. 1.

Referring particularly to the accompanying drawing, 10 represents the main or body portion of the trap, which is preferably formed from wire mesh and which is rust-proof. Extending from one portion of one end of the body or box of the trap is an extension or entrance chamber 11, also formed from rust-proof wire mesh, the top and bottom walls of which are continuations of the top and bottom walls of the box, and one of its side walls a continuation of the corresponding side wall of the box. In the end wall of the box, and establishing communication between the box and the entrance extension, is an opening 12, through which the fish pass, after entering the extension, for the purpose of being trapped in the box. The other side wall of the extension is formed with an opening 13, through which the fish pass to enter the extension. Located within the extension is a pan 14 containing the bait.

Disposed vertically within the box, and extending from the near side of the opening 12 to a point a suitable distance from the other side wall of the box, is a barrier or baffle wall 15, the top and bottom edges of which join with the top and bottom walls of the box, respectively. Thus, between the inner end of the wall 15, and the adjacent side wall of the box, there is formed an opening 16, which permits the fish to freely enter the box, but through which the fish will not pass to escape from the box.

In the operation of the trap, the bait being placed in the pan, and the trap lowered into the water, the fish will pass through the opening 13 and take a bite of the bait. The natural tendency of fish is to take a bite and then swim away to eat the same. In this instance, and taking advantage of this tendency, it will be seen that when the fish turns to swim away in a direction away from the box, it will encounter the curved end wall of the extension and again turn to try the opposite direction. This will lead the fish through the opening in the end wall of the box, and between the baffle wall and the side wall of the box, into the interior of the box proper, where it will be trapped.

What is claimed is:

A fish trap comprising a trapping chamber having an entrance opening in one end and adjacent one side thereof, an extension chamber covering said opening and connected to the end of the trapping chamber, said extension chamber having an entrance opening in one side thereof, a bait receptacle in the extension chamber, and an obliquely arranged baffle wall within the trapping chamber extending from the opening thereof to a point spaced from the adjacent side wall, and connected with the top and bottom of said trapping chamber.

In testimony whereof, I affix my signature in the presence of two witnesses.

FRANK ✕ PERKINS.
his / mark

Witnesses:
 DORRIS C. LEE,
 EMMA ROBERTS.